US006173807B1

(12) United States Patent
Welch et al.

(10) Patent No.: US 6,173,807 B1
(45) Date of Patent: Jan. 16, 2001

(54) ENGINE NACELLE ACOUSTIC PANEL WITH INTEGRAL WEDGE FAIRINGS AND AN INTEGRAL FORWARD RING

(75) Inventors: John M. Welch; Thomas D. Popp, both of Wichita; Robert F. Wikstrom, Derby; Terry W. Stratton, Rose Hill; Brian R. Kitt, Wichita, all of KS (US)

(73) Assignee: The Boeing Company, Seattle, WA (US)

( * ) Notice: Under 35 U.S.C. 154(b), the term of this patent shall be extended for 0 days.

(21) Appl. No.: 09/059,797

(22) Filed: Apr. 13, 1998

Related U.S. Application Data

(60) Provisional application No. 60/054,196, filed on Jul. 30, 1997.

(51) Int. Cl.[7] .......... F02K 1/00
(52) U.S. Cl. .......... 181/213; 29/890.08
(58) Field of Search .......... 181/213, 214, 181/286, 290, 292; 29/888.01, 890.08, 458; 156/242, 290, 291, 320

(56) References Cited

U.S. PATENT DOCUMENTS 4,026,105 5/1977 James .
4,030,290 6/1977 Stachowiak .
4,043,522 8/1977 Vetter .
4,232,513 11/1980 Pearson et al. .
4,235,303 11/1980 Dhoore et al. .
4,336,090 6/1982 Hilton .
4,421,201 12/1983 Nelsen et al. .
4,463,552 8/1984 Monhardt et al. .
4,495,764 1/1985 Gnagy .
4,504,346 * 3/1985 Newsam .......... 181/292
4,539,244 9/1985 Beggs et al. .
4,564,160 1/1986 Vermilye .
4,600,619 7/1986 Chee et al. .
4,759,964 7/1988 Fischer et al. .
4,779,240 10/1988 Dorr .
4,825,644 5/1989 Bubello et al. .
4,826,106 5/1989 Anderson .
4,852,805 8/1989 Vermilye .
5,054,281 10/1991 Mutch .
5,315,820 5/1994 Arnold .
5,498,462 3/1996 Darfler .
5,581,054 * 12/1996 Anderson et al. .......... 181/292

FOREIGN PATENT DOCUMENTS

3625534 A1 11/1988 (DE) .
0 540 193 5/1993 (EP) .
2 273 131 6/1994 (GB) .

* cited by examiner

*Primary Examiner*—Khanh Dang
(74) *Attorney, Agent, or Firm*—Christensen O'Connor Johnson Kindness PLLC

(57) ABSTRACT

An acoustic panel (26) for the nacelle (20) of a high bypass jet engine. The acoustic panel (26) has a perforated composite inner sheet (54), an outer composite sheet (96, 98), and a honeycomb-core material (74) sandwiched therebetween. The acoustic panel (26) includes an integral forward ring (36) and integral wedge fairings (44).

2 Claims, 19 Drawing Sheets

ENGINE NACELLE ACOUSTIC PANEL WITH INTEGRAL WEDGE FAIRINGS AND AN INTEGRAL FORWARD RING

REFERENCE TO RELATED APPLICATION

This application claims the benefit of U.S. Provisional Application No. 60/054,196, filed Jul. 30, 1997.

FIELD OF THE INVENTION

This invention is directed to a thrust reverser assembly for a high bypass jet engine, and more specifically, a method for forming an acoustic panel for a thrust reverser assembly.

BACKGROUND OF THE INVENTION

Airplane manufacturers are under increasing pressure to produce lightweight, strong, and durable aircraft at the lowest cost for manufacture and lifecycle maintenance. An airplane must have sufficient structural strength to withstand stresses during flight, while being as light as possible to maximize the performance of the airplane. To address these concerns, aircraft manufacturers have increasingly used fiber-reinforced resin matrix composites.

These composites provide improved strength, fatigue resistance, stiffness, and strength-to-weight ratio by incorporating strong, stiff, carbon fibers into a softer, more ductile resin matrix. The resin matrix material transmits forces to the fibers and provides ductility and toughness, while the fibers carry most of the applied force. Unidirectional continuous fibers can produce anisotropic properties, while woven fabrics produce quasi-isotropic properties. Honeycomb core is often sandwiched between composite sheets to provide stiff panels having the highest specific strength.

Because of the noise regulations governing commercial transport aircraft, high bypass engines incorporate acoustic panels within the nacelles. Conventionally, these elements are made with an inner perforated skin, a surrounding buried septum honeycomb core, and a non-perforated outer skin, such as described in U.S. Pat. Nos. 4,600,619; 4,421,201; 4,235,303; 4,257,998; and 4,265,955, which we incorporate by reference. The inner and outer skins are metal, usually aluminum, or composite, and the honeycomb core is either aluminum or composite. Manufacturing these acoustic panels is a challenge because of their size, their complex curvature and the close tolerances necessary for them to function properly.

As shown in FIG. 1, a nacelle 10 for a commercial high bypass jet engine includes a thrust reverser assembly having a fore-and-aft translating sleeve 11 to cover or expose thrust reverser cascades 12 when deploying thrust reverser blocker doors 15 carried on the translating sleeve. The thrust reverser assembly is positioned just aft of a jet engine, not shown, as is used on an airplane. The thrust reverser assembly is fitted within the nacelle 10. The thrust reverser cascades 12 are circumferentially spaced around the interior of the nacelle.

During normal flying operations the translating sleeve 11 is in a closed, or forward, position to cover the thrust reverser cascades 12. For landing an airplane, the translating sleeve 11 is moved from the closed position to the rearwardly extended, or deployed, position by means of actuator rods 18. This positioning routes exhaust gas to flow through the thrust reverser cascades 12 so as to slow down the aircraft on the ground. Exhaust is rerouted through the thrust reverser cascades 12 by closing the circumferentially positioned blocker doors 15.

The translating sleeve 11 is usually formed from a pair of semi-cylindrical outer cowl panels 13 (only one shown in FIG. 2) and a pair of semi-cylindrical inner acoustic panels 14 (only one shown in FIG. 2) bonded together to form the aft portion of the cylindrical nacelle 10. The outer cowl and acoustic panels 13, 14 are bonded at their aft ends and branch or diverge to provide a chamber for containing and concealing the thrust reverser cascades 12 and the associated support structures.

When the translating sleeve 11 is in the stowed position (FIG. 2), the leading ends of the acoustic panel 14 and the outer cowl panel 13 extend on opposite sides of the thrust reverser cascades 12. When the thrust reverser is deployed, the translating sleeve 11 is moved aft to expose the cascades 12 (FIG. 3). The fan duct blocker doors 15 at the forward end of the acoustic panel 14 are deployed to divert fan flow through the cascades 12. The blocker door assembly is described in U.S. Pat. No. 4,852,805.

To form an acoustic composite sandwich panel, prior art methods used a male lay-up mandrel. The perforated composite inner skin was laid against the upper surface of the mandrel and buried septum honeycomb core was laid over the inner perforated skin. A composite non-perforated skin was then laid over the honeycomb core, and the three layers were cured or co-cured so as to form a single part.

This method did not provide index control for the inner or outer surface of the perforated sheets. Inexact tolerances on the inner and outer surfaces made locating and attaching details on the inside or outside of the acoustic panel difficult.

Thermal residual stresses produced during the curing process caused the acoustic panels to warp. Although the warpage was predictable to some extent, it was usually not uniform over the entire surface, leaving the part less than the desired design shape. Joining the acoustic panel and the outer cowl panel at a continuous aft joint with a smooth connection was difficult. Significant rework and shimming were required to correctly position the outer cowl panel and attach fittings against the outer side of the warped acoustic panel to complete the connection. Resin flowed into the perforations of the honeycomb core during the curing process, requiring rework of the perforated surface.

The acoustic panel must include recesses for receiving the fan duct blocker doors to provide a streamlined continuation during normal operation of the engine. In addition, deployment of the fan duct blocker doors imposes large bending moments at the leading end of the acoustic panel. As can be seen in FIG. 3, to receive the fan duct blocker doors 15 and to oppose the load of the fan duct blocker doors 15 when the thrust reverser is deployed, prior art acoustic panels 14 typically included a separate diaphragm 16 that was fastened at the leading end of the acoustic panel 14, and reinforced by gussets (not shown). An aft ring 17 extended between the acoustic panel 14 and the diaphragm 16. The blocker doors 15 were hinged from the leading end of the diaphragm 16. A forward ring 18, sometimes called a "bullnose ring", extended from the leading edge of the diaphragm 16 toward the thrust reverser cascades 12.

Because the gussets, the forward ring 18, the aft ring 17, and the diaphragm 16 were separate pieces, assembly of the thrust reverser and acoustic panel was laborious. The associated fasteners and connecting parts added significant weight to the acoustic panel 14. The steep angles formed by forward and aft rings deterred anyone from trying to form them in a single piece. Reducing the number of parts will reduce assembly time and will improve performance because an integral part made to close tolerance with the method of the present invention will be more aerodynamically efficient.

The fan duct blocker doors 15 fold downward and fit within recesses on the inner side of the acoustic panel. The blocker doors are trapezoidal so when stored, they create a triangular gap that needed to be filled for proper efficient airflow. The triangular gaps were filled by separate "wedge fairings" that were difficult to install with precision. The wedge fairings did not provide significant sound absorption. Attempts to form the wedge fairings integrally with the acoustic panel have not been successful.

The acoustic panels usually require reinforcement in the areas of attachment so that stresses applied by fittings attached to the acoustic panel will not damage the skins or core during sustained ultimate loads. To provide support at areas of fastened detail, prior art added plies to the skins to make the areas for fastening thicker than surrounding areas of the panel. The plies decreased in width so that the edges of the added plies formed "steps" or "ramps". The ramps help to dissipate forces applied through the fasteners into the skin. The presence of extra composite material at the ramps meant that perforations cannot be practically provided in the area covered by the ramps. Therefore, use of the ramps decreases the sound absorption area of the acoustic panel. There is a need for an acoustic panel that provides reinforcement in areas of fastened detail with a minimal loss of acoustic absorbing area.

Because the buried septum honeycomb core has little compressive and shear strength in directions parallel to the panel surface, it is often necessary to reinforce the honeycomb core in areas around fasteners and along the edges of the panels. Often, a dense core is substituted for the honeycomb core in the area to receive a fastener. Alternatively, portions of the honeycomb core can be removed and replaced by a potting compound. Potting compounds are also used along the edges of the panels. Each of these solutions poses problems. Dense cores are expensive and require additional processing steps to insert. Potting compounds are heavy, often disconnect with the composite skins, and require extensive labor to apply. There is a need for a more efficient way of providing support for a fastener in a composite. In addition, there is a need for a more efficient manner of providing solid edges ("closeouts") for a panel.

Composite panels are often tested prior to use by ultrasonic inspection. During a typical ultrasonic inspection, a Through Transmission Ultrasonic (TTU) sender is mounted on the opposite side of honeycomb-core composite panel from a TTU receiver. The TTU sender and the TTU receiver each have a water column that extends to the honeycomb-core composite panel. The TTU sender sends a signal that propagates through its water column, through the honeycomb-core composite panel, through the water column of the TTU receiver, and to the TTU receiver. Variations in the signal resonant frequency received by the TTU receiver indicate either changes in internal structure of the panel or internal flaws within the composite assembly.

A problem occurs when the TTU sender and TTU receiver approach an area of angular change in the honeycomb-core composite panel. If the water column is not extending parallel to the surface of the part, the signal path can be altered, causing inaccurate data from the TTU printout. There is a need for a method of more accurately performing nondestructive inspection in areas of angular change in a honeycomb-core composite panel.

SUMMARY OF THE INVENTION

The present invention is an acoustic panel for a thrust reverser assembly in a high bypass engine having an integral composite forward ring along the forward edge.

In accordance with another aspect of the present invention, the acoustic panel includes an integral diaphragm aft of the integral forward ring.

In accordance with still another aspect of the present invention, the forward ring includes a nose that rolls forward and downward into a rolled lip.

The present invention further provides a composite acoustic panel and integral forward ring for an engine nacelle. The acoustic panel includes a composite inner face sheet, a central honeycomb core extending over at least a portion of the composite inner face sheet, the central honeycomb core having an outer surface opposite the composite inner face sheet, and a composite outer face sheet extending over the outer surface of the honeycomb core and defining a leading edge and an outer panel surface opposite the honeycomb core. A diaphragm core is situated on the outer panel surface adjacent to the leading edge sheet, the diaphragm core having an exposed surface. A diaphragm face sheet covers the exposed surface of diaphragm and defines a second leading edge. The leading edges form a forward ring for the acoustic panel.

In accordance with other aspects of the present invention, the diaphragm core is honeycomb having cells extending substantially perpendicular to the first composite outer face sheet, and the diaphragm core tapers in thickness as the diaphragm core approaches the integral ring. The tapered section includes expanded and hardened epoxy within the cells.

The present invention further provides an acoustic panel for a engine nacelle having a perforated composite sandwich panel shaped to surround the engine and an integral composite forward ring formed into the panel.

In accordance with another aspect of the present invention, the integral ring includes a nose that rolls forward and downward into a rolled lip. Preferably, the nose forms approximately a 67.5° angle to the plane of the acoustic panel, and the rolled lip forms approximately a 122.5° angle to the nose.

The present invention also provides a method of forming a forward ring integral with a composite panel. The method includes the steps of stacking an inner face sheet, a honeycomb core, and first outer face sheet on a lay-up mandrel, and arranging composite material for an integral ring against the lay-up mandrel having a contour that substantially matches an intended final shape of the integral ring. A plug is placed against the side of the composite material for the integral ring opposite of the contour of the lay-up mandrel, and the acoustic panel is bagged within a vacuum bag so that the vacuum bag is placed around and against the plug. Vacuum is applied to the vacuum bag during curing so that the plug presses the material for the integral ring in place.

The present invention also provides an acoustic panel having an acoustic area extending along an inner surface and having at least one integral wedge fairing for filling the gap between distal side edges of thrust reverser blocker doors of a thrust reverser assembly when the thrust reverser blocker doors are in a stored position and extend substantially parallel to the acoustic panel, the wedge fairing arranged on the leading end of the acoustic panel.

In accordance with yet another aspect of the present invention, a diaphragm is formed integral with the acoustic panel, the diaphragm located just below the wedge fairing and designed to extend under the thrust reverser blocker doors when the thrust reverser blocker doors are in the stored position.

In accordance with still another aspect of the present invention, the wedge fairing is mounted on the inside of a diaphragm for the acoustic panel and cross-sections of the wedge fairing taken parallel to the diaphragm increase in area as the cross-sections are removed from the diaphragm.

In accordance with still other aspects of the present invention, the wedge fairing includes buried-septum honeycomb core therein.

In accordance with yet still another aspect of the present invention, the wedge fairing extends from the perforations to a diaphragm for the acoustic panel, the diaphragm located just below the wedge fairing and designed to extend under the thrust reverser blocker doors when the thrust reverser blocker doors are in the stored position.

The present invention further comprises an acoustic panel for an engine nacelle having a perforated composite inner sheet, a composite core having a buried septum arranged over the perforated composite inner sheet, and an outer composite sheet arranged over the composite core. A wedge fairing extends out of a leading edge of the panel and is formed integral with the perforated composite inner sheet The present invention further provides a method of forming a composite acoustic panel having integral wedges. The method includes providing an outer composite sheet, extending a peelable sheet having a predetermined pattern for the aft portion of the wedge formed therein on the aft portion of the outer composite sheet, and arranging a composite core having expanded and hardened epoxy inserted where the aft edges of the wedge fairings will be formed over the outer composite sheet and the peelable sheet. A perforated composite inner sheet is arranged over the composite core. The perforated composite inner sheet and the composite core are machined substantially to the peelable sheet along a machine line at a pattern that forms the aft portion of the wedge fairings. The portion of the composite core aft of the machined line is then removed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
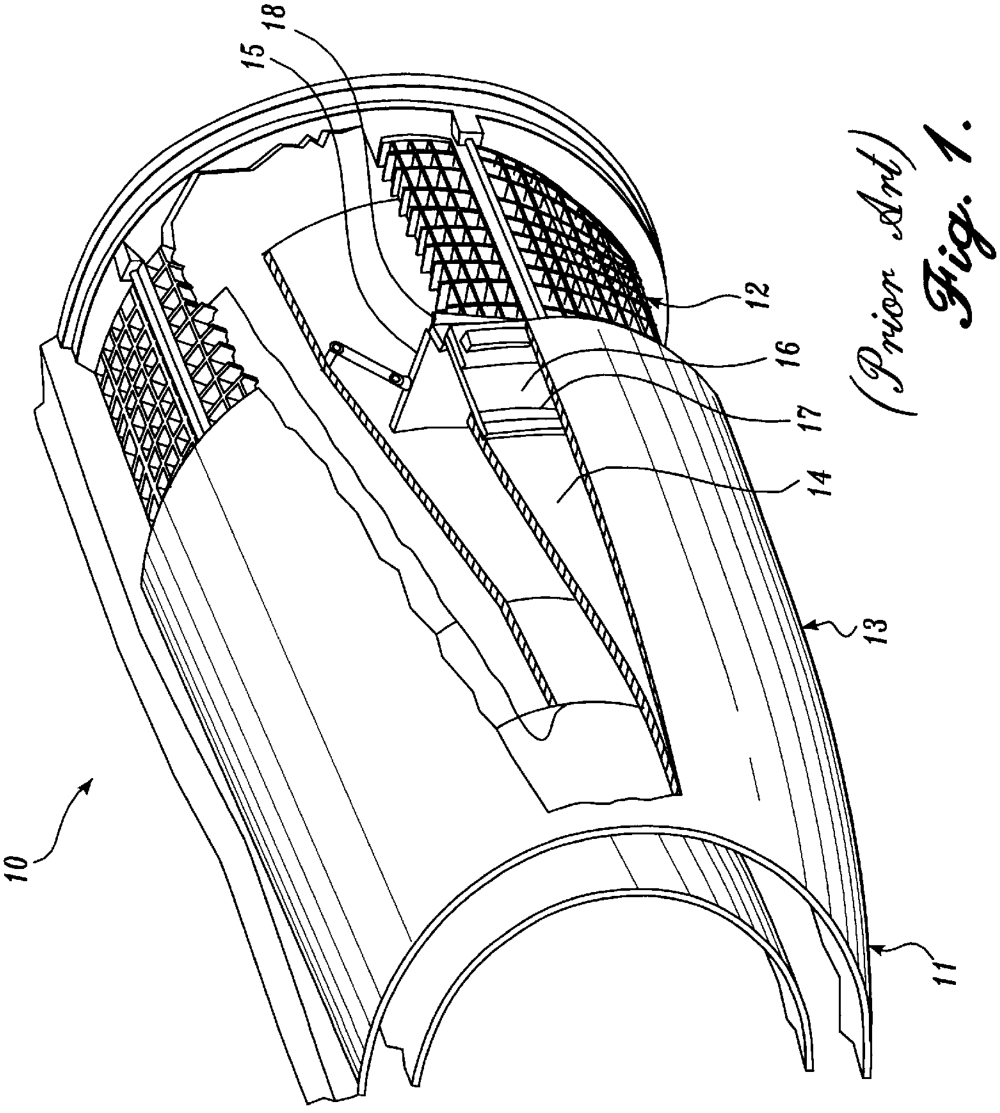
(Prior Art) Fig. 1.
FIG. 1 is a fragmentary, partially cut-away pictorial view of a jet engine nacelle, illustrating a portion of a prior art jet engine thrust reverser assembly.
Figure 2:
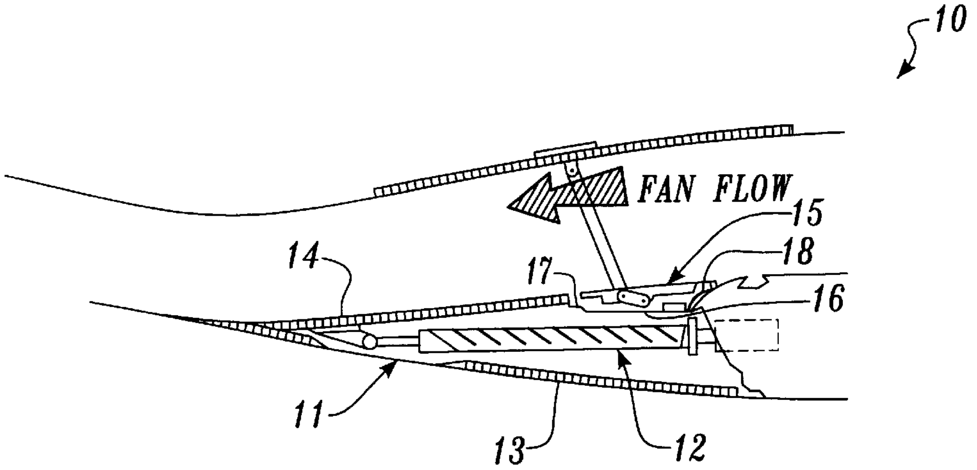
Fig. 2 (PRIOR ART)
FIG. 2 is a cross-section, taken fore-to-aft, of a prior art translating sleeve and thrust reverser assembly, with the thrust reverser in the stored position.
Figure 3:
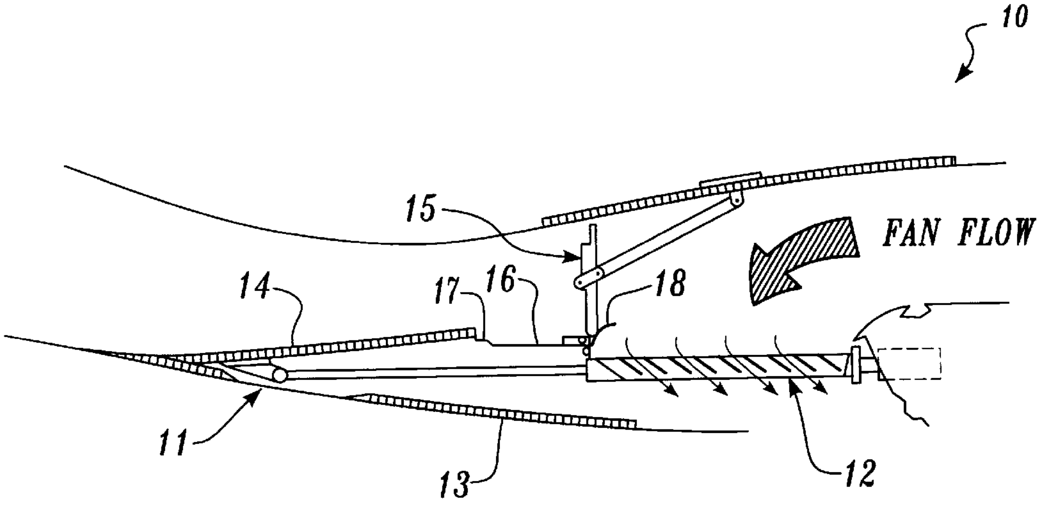
Fig. 3 (PRIOR ART)
FIG. 3 is a cross-section, taken fore-to-aft, of a prior art translating sleeve and thrust reverser assembly, with the thrust reverser in the deployed position.
Figure 4:
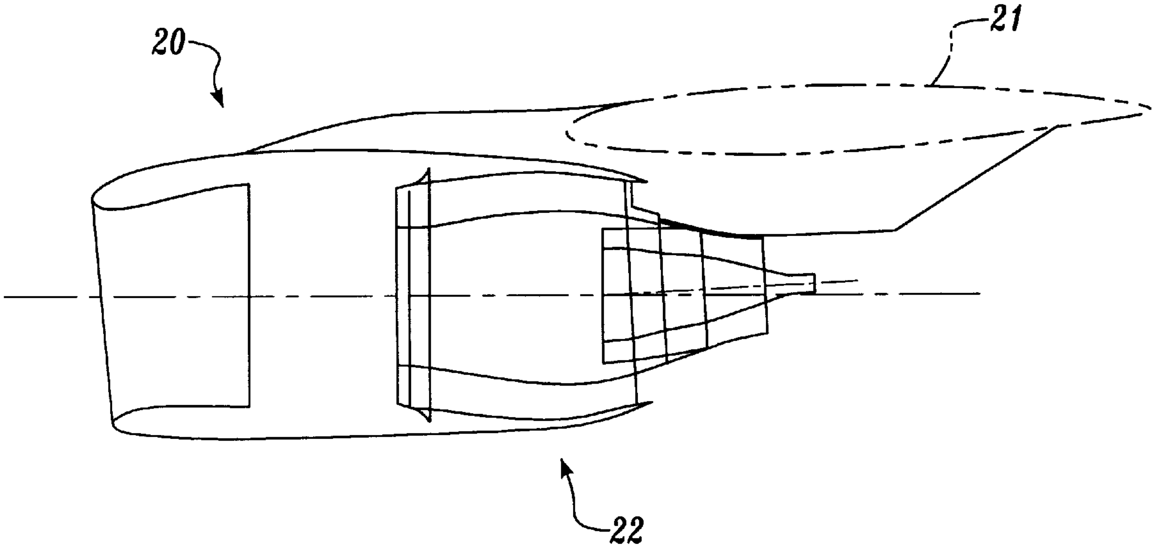
FIG. 4 is a side view of a nacelle incorporating the present invention.

Referring now to the drawings, in which like reference numerals represent like parts throughout the several views, FIG. 4 shows a nacelle 20 mounted by a strut under the wing 21 of an airplane. A translating sleeve 22 that is part of a thrust reverser assembly 23 (FIG. 5) is located at the aft portion of the nacelle 20.

Figure 5:
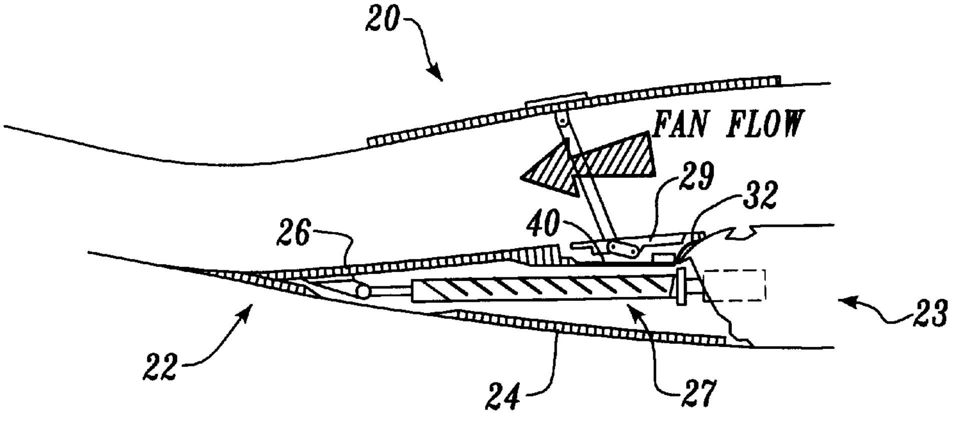
FIG. 5 is a cross-section, taken fore-to-aft, of the translating sleeve and thrust reverser assembly of the nacelle of FIG. 4, with the thrust reverser in the stored position.

The generally semi-cylindrical translating sleeve 22 is formed by two outer cowl panels 24 (only one is shown in FIG. 5) and two inner acoustic panels 26 (only one shown). For ease of reference, only one of the outer cowl panels 24 and one of the acoustic panels 26, and their respective connections to each other, will be described. The other outer cowl panel 24 and other acoustic panel 26 are substantially the same as the outer cowl panel and acoustic panel described, but may be arranged differently because of the location within the nacelle 20 and the relative position of the panels in relation to the thrust reverser assembly 23.

Figure 6:
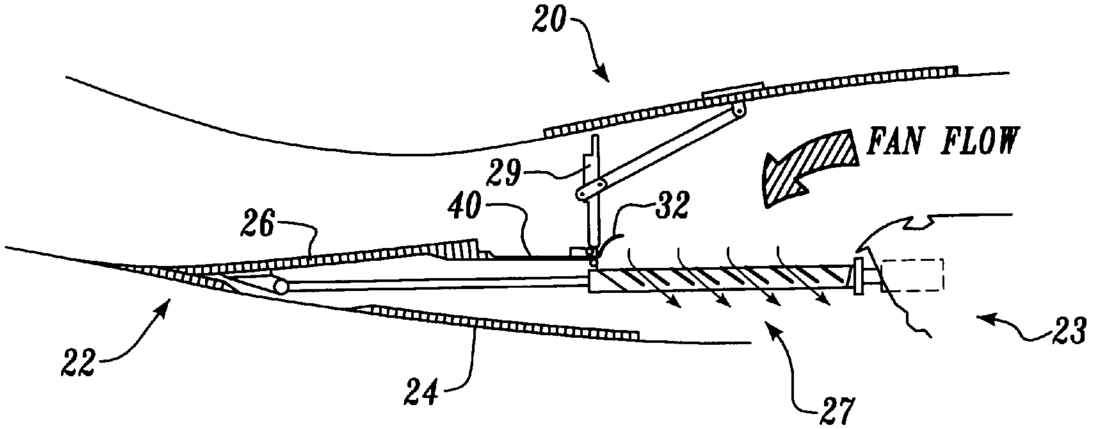
FIG. 6 is a cross-section, taken fore-to-aft, of the translating sleeve and thrust reverser assembly of the nacelle of FIG. 4, with the thrust reverser in the deployed position.

The outer cowl panel 24 and the acoustic panel 26 are bonded at their aft ends and branch or diverge to provide a chamber for containing and concealing thrust reverser cascades 27 and the associated support structures. When the translating sleeve 22 is in the stowed position, the leading ends of the acoustic panel 26 and the outer cowl panel 24 extend on opposite sides of thrust reverser cascades 27 (FIG. 5). When the thrust reverser assembly 23 is deployed (FIG. 6), the translating sleeve 22 moves aft to expose the thrust reverser cascades 27. During this movement, fan duct blocker doors 29 attached to the forward end of the acoustic panel 26 are deployed to direct fan flow through the thrust reverser cascades 27.

Figure 7:
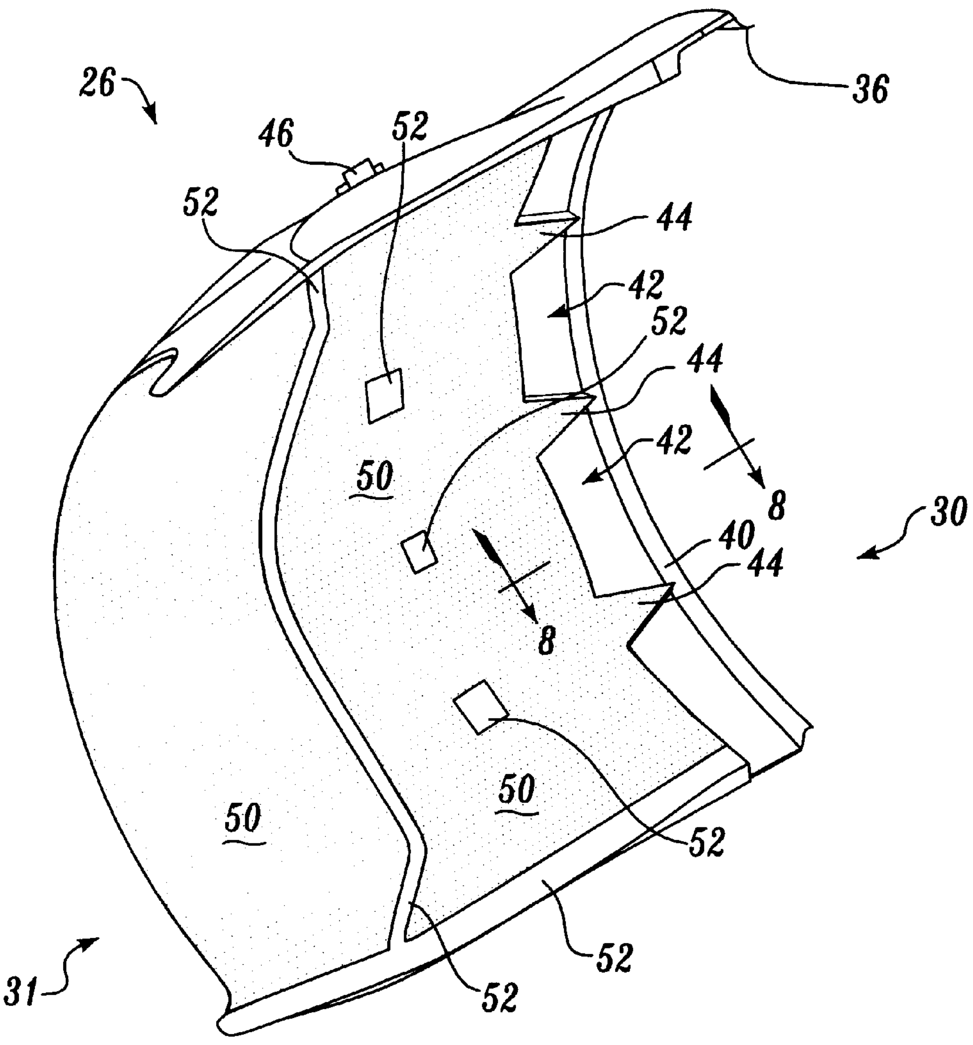
FIG. 7 is an isometric view of an acoustic panel for use in the nacelle of FIG. 4.
Figure 8:
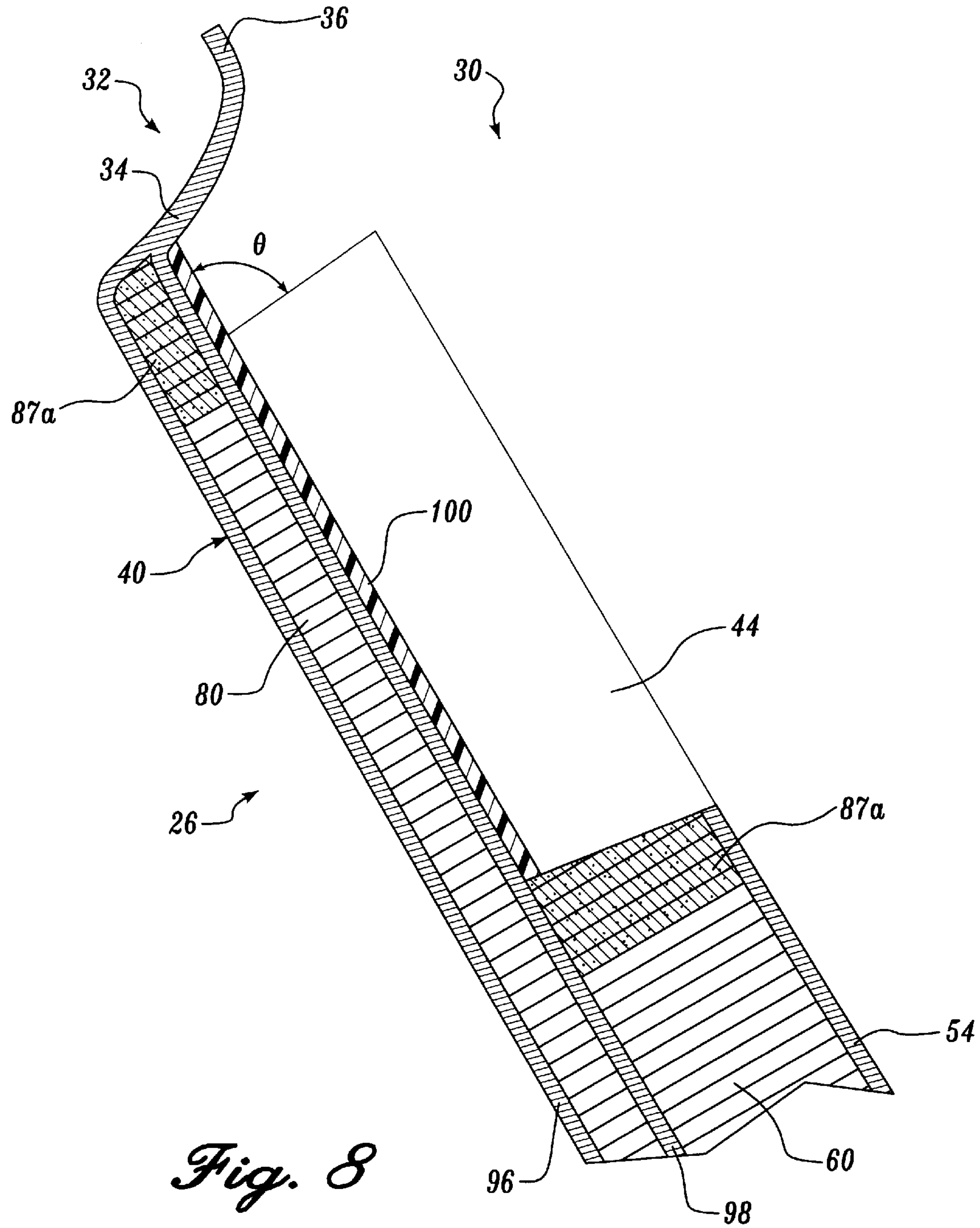
FIG. 8 is a sectional view of the acoustic panel of FIG. 7 taken along the section lines 8—8.
Figure 9:
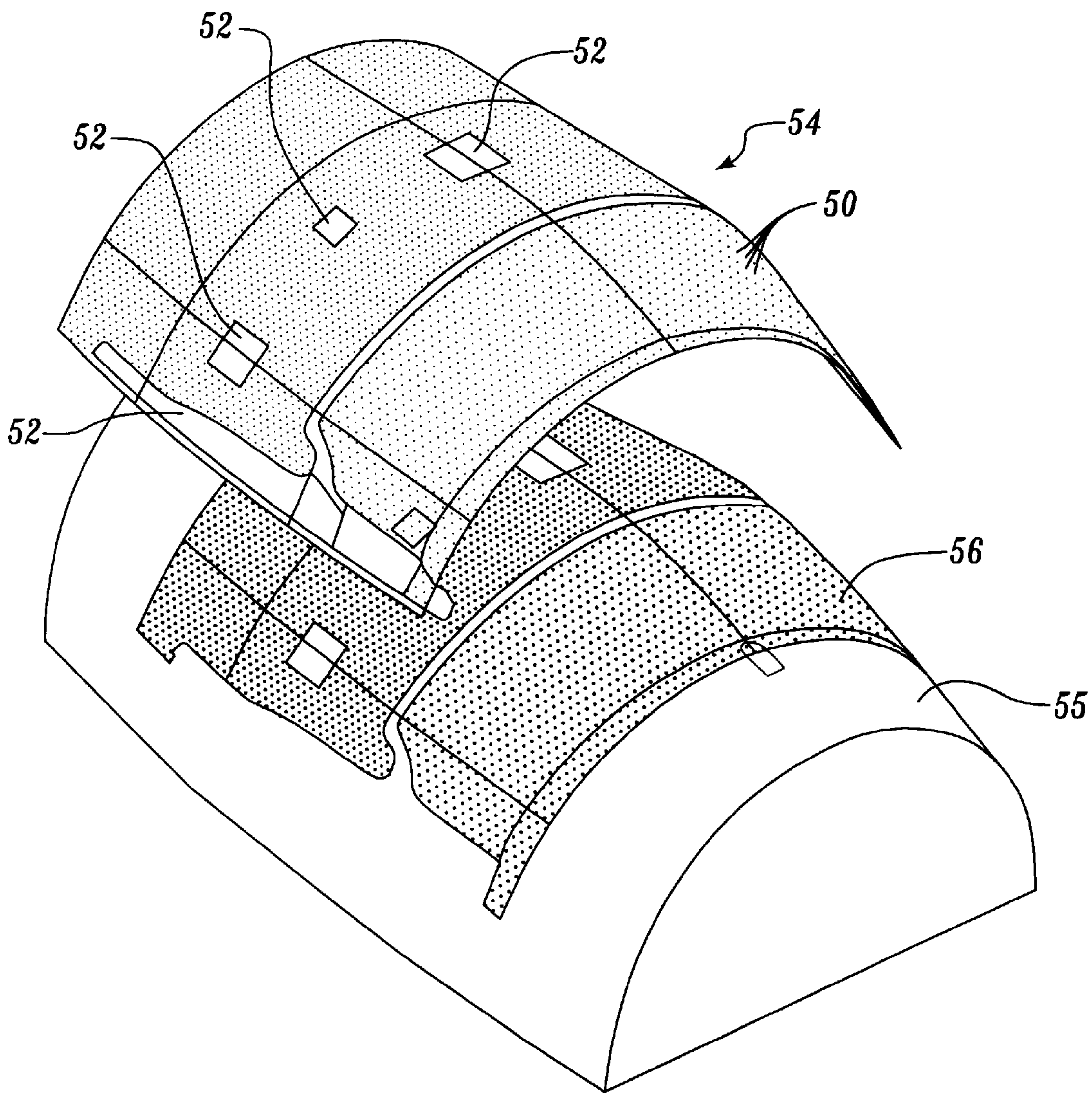
FIG. 9 is an isometric view showing an initial stage of assembly of the acoustic panel of FIG. 7 in which a perforated sheet has been formed and is removed from a pin mandrel.

Referring now to FIG. 7, the acoustic panel 26 includes a leading end 30 and a trailing end 31. An integral forward ring 32 (FIG. 8) is located at the leading end 30 of the acoustic panel 26. The forward ring 32 extends downward and outward from the leading end 30 of the acoustic panel 26 and forms a nose 34 that extends outwards to a rolled lip 36. The nose 34 forms an approximate 67.5° angle to the plane of the acoustic panel 26, and the rolled lip forms an approximate 112.5° angle to the nose.

Just aft of the integral ring 32 is a diaphragm 40 having a number of recesses 42 (FIG. 7). The recesses 42 are arranged to receive the fan duct blocker doors 29 of the thrust reverser assembly 23. The fan duct blocker doors 29 are rotatably attached to hinge fitting assemblies (not shown) located at the forward end of the diaphragm 40.

As is known in the art, the shape of the fan duct blocker doors 29 required for proper translation of the fan duct blocker doors creates a triangular gap between the distal edges of adjacent fan duct blocker doors when the fan duct blocker doors are stowed. The triangular gaps between the fan duct blocker doors 29 are filled by wedge fairings 44 attached on the inner surface of the diaphragm. The wedge fairings 44 are formed integral with the acoustic panel 26.

A number of fittings 46 (FIG. 7—only one shown) are attached onto the outer surface of the acoustic panel 26. The fittings 46 are the attachment structure for the actuation assembly (not shown, but well known in the art) for the thrust reverser assembly 23.

The internal surface of the acoustic panel 26 includes perforations 50. The perforations 50 extend from the leading end of the acoustic panel 26, to and over the wedge fairings 44. Areas 52 of the internal surface of the acoustic panel 26 do not include perforations 50. The non-perforated areas 52 include structure (described in detail below) for supporting the fittings 46.

Figure 10:
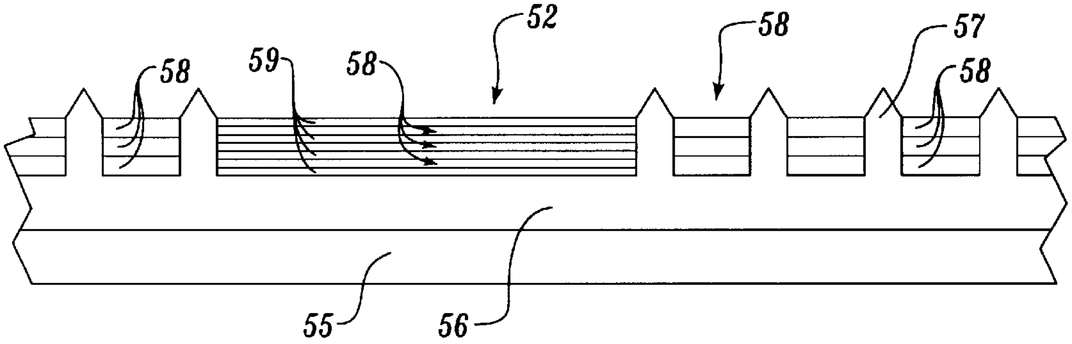
FIG. 10 is a diagrammatic view showing the forming of perforations in the perforated sheet of FIG. 9.

The acoustic panel 26 is formed in a number of stages shown in FIGS. 9–14, 17–21. In an initial stage shown in FIG. 9, a perforated sheet 54 is formed on a convex lay-up mandrel 55. A pin mat 56 is situated on the lay-up mandrel 55. Pins 57 extend orthogonally out of the pin mat 56 (FIG. 10). The pins 57 are arranged so as to correspond with the locations of the perforations 50 on the interior surface of the acoustic panel 26 FIG. 7). Pins 57 are not included in the regions that correspond with the non-perforated areas 52 of the interior surface of the acoustic panel 26.

The perforated sheet 54 is preferably formed by a stack of three prepreg woven sheets 58 (FIG. 10). The prepreg woven sheets 58 are preferably interwoven graphite impregnated with an epoxy resin. At the non-perforated areas 52 where pins are not located on the pin mat 56, four layers of unidirectional tape 59 are stacked alternatingly with the prepreg woven sheets 58. The prepreg woven sheets 58 are preferably arranged so that the fibers in the top sheet are arranged at +/−45 degrees to the longitudinal axis of the lay-up mandrel 55, and the fibers in the middle and bottom prepreg sheets are arranged at 0/90 degrees to the longitudinal axis of the lay-up mandrel. The four layers of unidirectional tape 59 are preferably aligned alternatively at 0 and 90 degrees to the longitudinal axis of the lay-up mandrel 55. By arranging the unidirectional tape 59 and the prepreg woven sheets 58 in this manner, the perforated sheet 54 has the strongest tensile strength in both the air flow direction (fore-to-aft) and the semi-circular "hoop" direction of the acoustic panel 26. The function of the alignment of the fibers in the prepreg woven sheets 58 and the unidirectional tape 59 is described in detail below.

The prepreg woven sheets 58 are pressed onto the pin mat 56 (FIG. 9) by pressure rolling or another method known in the art. The entire structure is then bagged (not shown, but well known in the art) and placed in an autoclave (also not shown). The perforated sheet 54 is then staged, or partially cured, at 270° F. During the perforating and staging process, the perforated areas of the perforated sheet 54 swell so that the perforated areas of the sheet, despite being only three layers, are substantially the same thickness as the non-perforated areas 52 of the perforated sheet.

Figure 13:
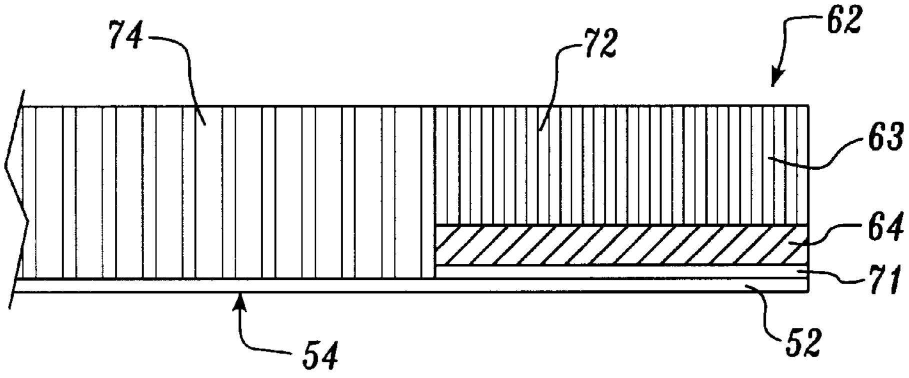
FIG. 13 is a cross-section, taken fore-to-aft, of an acoustic core for the acoustic panel of FIG. 7.

The perforated sheet 54 is used as the bottom layer in an acoustic core 60 (FIG. 8) that is formed in the build-up process shown in FIG. 13. As can best be seen in FIG. 13, pre-cured doublers 62 are attached to the non-perforated areas 52 of the perforated sheet 54. The pre-cured doublers 62 provide structural strength along the edges and at discrete attachment areas of the acoustic core 60 and for the attachment of the fittings 46 on the back of the acoustic panel 26 (FIG. 7).

Figure 11:
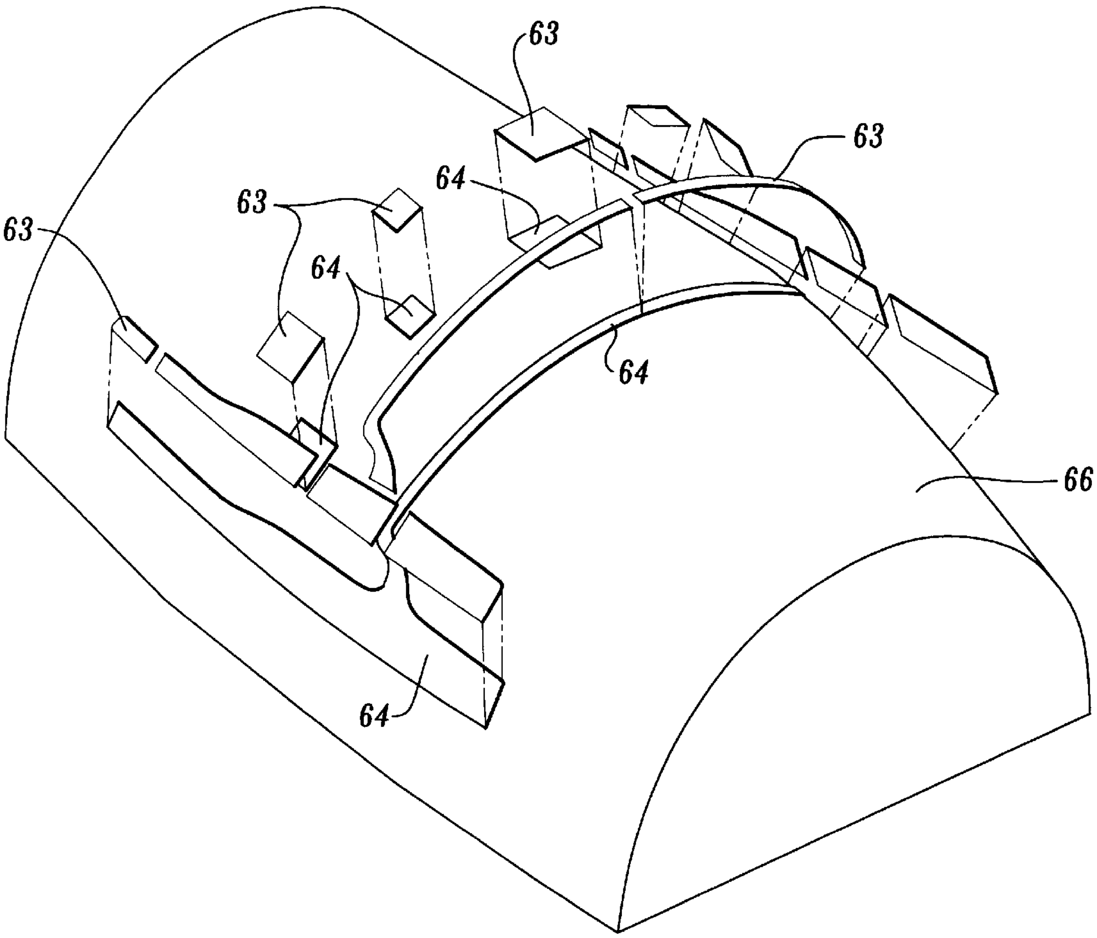
FIG. 11 is an isometric view showing a stage of assembly of a pre-cured doubler for use in the acoustic panel of FIG. 7.

The pre-cured doublers 62 are formed on a second convex lay-up mandrel 66 shown in FIG. 11. The arrangement of the pre-cured doublers 62 on the second convex lay-up mandrel 66 is preferably the same as the shape of the non-perforated areas 52 of the perforated sheet 54. In the embodiment shown, the pre-cured doublers 62, as well as the non-perforated areas 56 of the perforated sheet 50, are arranged in an "H" formation with the sides of the "H" corresponding with the sides of the acoustic panel 26 and the central bar of the "H" arranged to extend opposite the fittings 46. Four individual pre-cured doublers 62 are located underneath the bar of the "H". It is to be understood that the pre-cured doublers 62 can be arranged in any suitable manner so that adequate attachment strength is provided for all fittings 46 that attach to the acoustic panel 26.

Figure 12:
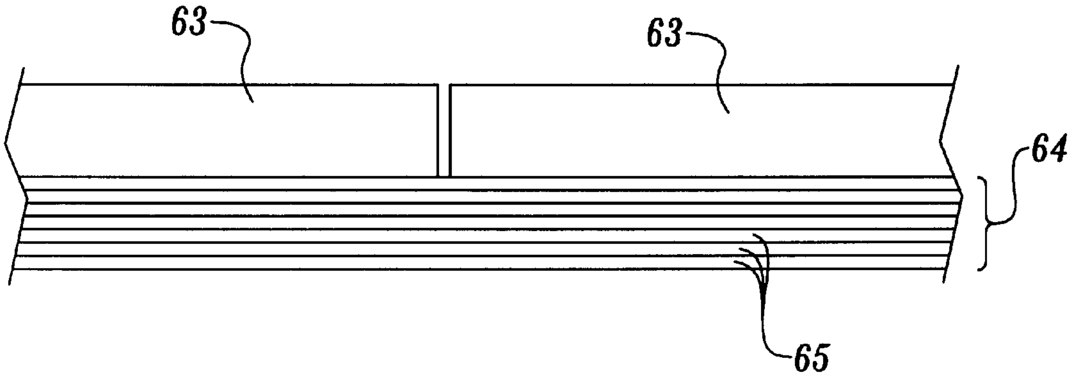
FIG. 12 is a diagrammatic view showing the forming of a pre-cured doubler in accordance with the stage of assembly shown in FIG. 11.

The pre-cured doubler 62 consists of a dense core 63 and a lower face sheet 64. The dense core 63 is preferably a graphite/epoxy dense core. As can be seen in FIG. 12, the lower face sheet 64 is formed by stacking six (6) prepreg sheets 65 on the second convex lay-up mandrel 66 (FIG. 11). The prepreg sheets 65 are preferably interwoven carbon fibers in an epoxy matrix. The prepreg sheets 65 are preferably arranged so that the fibers of the prepreg sheets are aligned +/−45°, 0°/90°, +/−45°, +/−45°, 0°/90°, and +/−45°, respectively, to the longitudinal axis of the second convex lay-up mandrel 66. This longitudinal axis corresponds with the air flow direction of the acoustic panel 26.

After the prepreg sheets 65 are arranged on the second lay-up mandrel, sections of the core 63 are cut into desired shapes and glued by an adhesive layer (not shown) to the top of the upper surface of the stack of prepreg sheets 65. Foaming adhesive (not shown, but well known in the art) is applied between adjacent sections of the core 63.

After the pre-cured doublers 62 are properly arranged on the second convex lay-up mandrel 66, the pre-cured doublers 62 and the second convex lay-up mandrel 66 are bagged and placed in an autoclave. The pre-cured doublers 62 are then staged, or partially cured.

As stated earlier, the non-perforated areas 52 of the perforated sheet 54 (FIG. 9) include unidirectional tape 59 (FIG. 10) extending 0 and 90 degrees to the air flow direction of the acoustic panel 26 and prepreg sheets 58, the majority of which have fibers extending 0 degrees to the air flow direction of the acoustic panel 26. The acoustic doublers 62 (FIG. 13), on the other hand, have interwoven carbon fiber prepreg sheets 65, the majority of which have carbon fibers aligned +/−45 degrees to the air flow direction. These arrangements are made so that an exemplary interface can be made between the non-perforated areas 52 of the perforated sheet 54 and the pre-cured doublers 62. Preferably, the thicknesses and moduli of elasticity of the pre-cured doublers 62 and the non-perforated areas 52 of the perforated sheet 54 are related substantially by the formula:

$$(Ed)(Td)=(En)(Tn)$$

Where Ed is the modulus of elasticity of the pre-cured doubler 62 in the direction of air flow, Td is the thickness of the pre-cured doubler 62, En is the modulus of elasticity of the non-perforated area 52 in the direction of air flow, and Tn is the thickness of the non-perforated area 52.

The modulus of elasticity is a measure of the stiffness of a material. A stiff material, with a high modulus of elasticity, will elastically deform less than a less stiff material under the same load, assuming that the two materials are the same thickness. The tensile strength, and therefore the modulus of elasticity, of the non-perforated areas 52 of the perforated sheet 54 in the air flow direction is greater than the tensile strength of the pre-cured doublers 62. This is largely because the majority of the fibers in the non-perforated areas 52 of the perforated sheet 54 are aligned in the air flow direction, whereas the majority of the fibers in the pre-cured doublers 62 are aligned at 45° from the air flow direction.

By increasing the thickness of a material, deformation of that material under applied stress will be less. By making the thickness of the pre-cured doublers 62 so that the pre-cured doubler and the non-perforated areas 52 meet the above formula, the pre-cured doubler and the non-perforated areas deform nearly the same amount under force. This permits the non-perforated areas 52 of the perforated sheet 54 to absorb any deformation in the pre-cured doublers 62 which may be caused by stress, avoiding excessive rubbing, wearing, peeling, or seizing between the respective parts.

By matching the moduli of elasticity and thicknesses in this manner, the pre-cured doubler 62 can transmit forces into the non-perforated areas 52 without excessive strain being placed at the bonded interface of the non-perforated areas 52 and the pre-cured doublers 62. Forces are received by the pre-cured doublers 62 and are transferred into the non-perforated areas 52. This permits the strains passed through the pre-cured doublers to transmit to the perforated regions of the perforated sheet 54 without need for a "stepped" or "ramp" region as was described in the background section of this disclosure.

By eliminating a ramped region near areas needing reinforcement, the pre-cured doublers 62 permit the perforations 50 of the perforated sheet 54 to extend up to and against the non-perforated areas 52 of the perforated sheet 50. This construction permits an increase of acoustic area over prior art honeycomb core composite acoustic panels.

Figure 14:
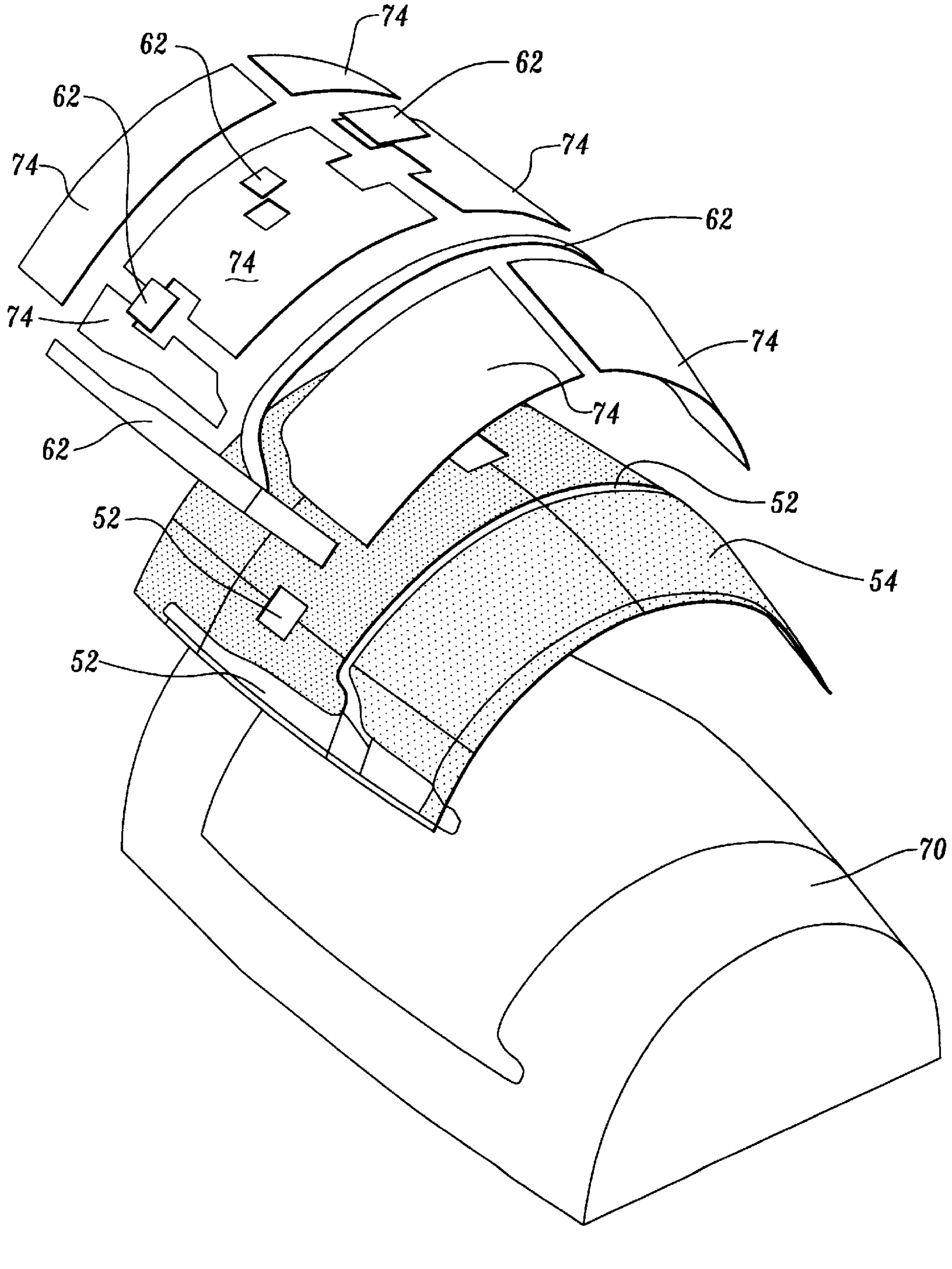
FIG. 14 is an isometric view showing a stage of assembly of the acoustic panel of FIG. 7 in which an acoustic core is formed.

After the pre-cured doublers 62 are staged, the perforated sheet 54 and the pre-cured doublers 62 are arranged on a third convex lay-up mandrel 70 (FIG. 14). The upper face of the third convex lay-up mandrel 70 has a contour that substantially matches the final shape of the inner surface of the part being formed, i.e., the acoustic panel 26. The perforated sheet 54 is laid over the upper face of the third convex lay-up mandrel 70. The pre-cured doublers 62 are then attached by an adhesive layer 71 (FIG. 13) to the non-perforated areas 52 of the perforated sheet 54.

The adhesive layer 71 is preferably "elastomeric" in nature, meaning that the adhesive layer 71 is capable of deformation or compression by elastic movement of the relatively moving pre-cured doubler 62 and the non-perforated areas 52 of the perforated sheet 54. The elastomeric qualities of the adhesive layer 71 permit the adhesive layer 71 to be deformed, sheared, or compressed by relative movement between and the pre-cured doubler 62 and the non-perforated areas 52 of the perforated sheet 54, and to absorb the kinetic and sonic energy of the relatively moving surfaces.

The adhesive layer 71 has a memory for its original shape, and resiliently returns the pre-cured doubler 62 and the non-perforated areas 52 of the perforated sheet 54 into their original configuration over a brief period of time. The adhesive layer 71 preferably has a tendency to resist shear, deformation or compression up to and including ultimate load, thus slowing the relative movement of the pre-cured doubler 62 relative to the non-perforated areas 52 of the perforated sheet 54. Thus, the adhesive layer serves as a shock absorber between the pre-cured doubler 62 and the non-perforated areas 52 of the perforated sheet 54. An adhesive layer 71 made of epoxy adhesive, having viscoelastic properties such that the sliding of the pre-cured doubler 62 relative to the non-perforated areas 52 of the perforated sheet 54 is resisted, has been found to be a satisfactory material. Many materials having a relatively low durometer of elasticity, and formed either in a layer or in other configurations sandwiched between or otherwise interconnected to the pre-cured doubler 62 and the non-perforated areas 52 of the perforated sheet 54 are also satisfactory for use in this invention.

The thicker the adhesive layer 71, the more the adhesive layer 71 acts as a shock absorber to transfer forces from the pre-cured doubler 62 to the perforated sheet 54. However, if the adhesive layer 71 is too thick, the adhesive can flow during the curing process from underneath the pre-cured doubler 62 into the perforations 50 surrounding the pre-cured doubler. Therefore, a balance must be made between the need for a shock absorber and the desire not to have the adhesive flow. Applicants have found that a suitable epoxy adhesive thickness is approximately 0.015 inches.

After the pre-cured doublers 62 are attached by the adhesive layer 71 to the top of the non-perforated areas 52 of the perforated sheet 54, fiberglass cores 74 are applied over the perforated sheet 54 in the areas not covered by the pre-cured doublers 62. The fiberglass cores 74 preferably include buried septums (not shown, but well known in the art). The fiberglass cores 74 are attached to the perforated areas of the perforated sheet 54 with a layer of adhesive (not shown). The acoustic core 60 is now fully assembled (FIG. 14).

Figure 18A:
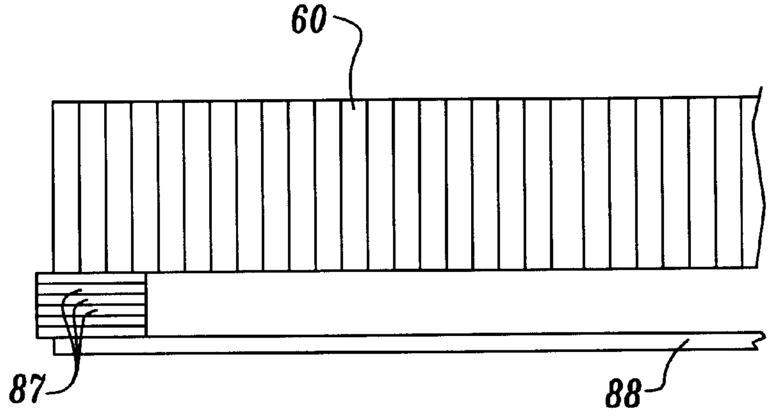
FIG. 18A is a diagrammatic view showing the addition of expanding epoxy strips below the diaphragm core of FIG. 17.
Figure 18B:
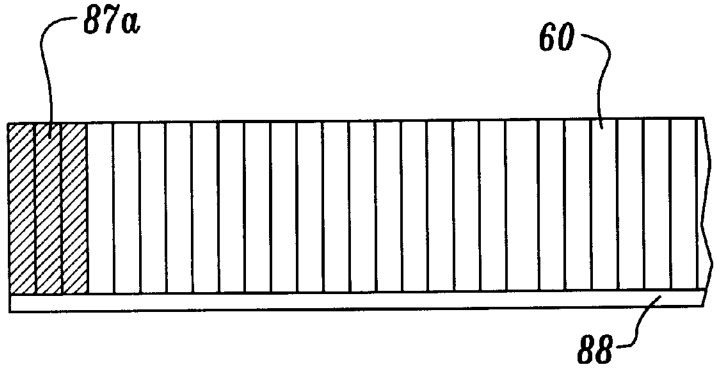
FIG. 18B shows the diaphragm core of FIG. 18A, with expanded epoxy formed in cells of the diaphragm core from the expanding strips shown in FIG. 18A.

Prior to curing, the acoustic core 60, stacks of expanding epoxy strips 87 (FIG. 18A), such as Synspand™ expanding epoxy strips made by Hysol Adhesives of Pittsburgh, Calif., are placed onto a lay-up mandrel 88. The acoustic core 60 is then arranged over the expanding epoxy strips 87 so that expanding epoxy strips are under the edges of the acoustic core (FIG. 18A). The expanding epoxy strips 87 expand during a curing process to form expanded and hardened epoxy 87*a* (FIG. 18B) that fills adjacent cells of the honeycomb structure of the acoustic core 60. The expanded and hardened epoxy 87*a* adds structure to and reinforces the honeycomb structure of the fiberglass core 74. The expanding epoxy strips 87*a* are preferably arranged along the edges of the acoustic core 60 so as to fill the adjacent cells of the acoustic core with expanded and hardened epoxy 87*a*. Other expanding epoxy strips 87 can be selectively placed in areas that need structure or reinforcement. For example, expanded and hardened epoxy 87*a* can be used to reinforce the areas surrounding a fastener, eliminating the need for a dense core or potting compound.

The expanding epoxy strips 87 are used to form the periphery for the wedge fairings 44 and the aft wall for the recesses 42. Application of the expanding epoxy strips 87 to this area is shown in FIG. 20. A phenolic guide 81 is provided for positioning the expanding epoxy strips 87 at the proper places above the acoustic core 60. The acoustic core 60 is arranged on a lay-up mandrel. The phenolic guide 81 includes a channel 83 for receiving the expanding epoxy strips 87. The channel 83 is approximately 0.50 inches thick, and is arranged so that it is centered over the eventual contour for the wedge fairings 44 and the aft wall for the recesses 42. The expanded epoxy 87*a* formed by application through the phenolic guide 81 is shown in the acoustic core 60 in FIG. 19.

During the curing process, the expanding epoxy strips 87 are pulled by suction into the selected honeycomb structure of the acoustic core 60. The expanding epoxy strips 87 require a special curing process to expand into the acoustic core 60. First, the expanding epoxy strips 87 are placed onto the lay-up mandrel 70 or into the phenolic guide 81 and the acoustic core 60 is set in place. The acoustic core 60 and the expanding epoxy strips 87 are then covered with a vacuum bag for applying uniform pressure. The lay-up mandrel 70 is then placed in an autoclave and is heated to 110 degrees Fahrenheit. Vacuum bag pressure is applied so that the softened expanding epoxy strips 87 are forced into the cells of the acoustic core 60. The temperature is raised no more than substantially five degrees Fahrenheit per minute until a temperature of 270 degrees Fahrenheit has been reached. The autoclave is maintained at 270 degrees Fahrenheit for substantially 45 minutes thereby allowing the expanding epoxy strips 87 to filly expand into the cells of the acoustic core 60. The expanded and hardened epoxy 87*a* is then fixed within the acoustic core 60.

Figure 16:
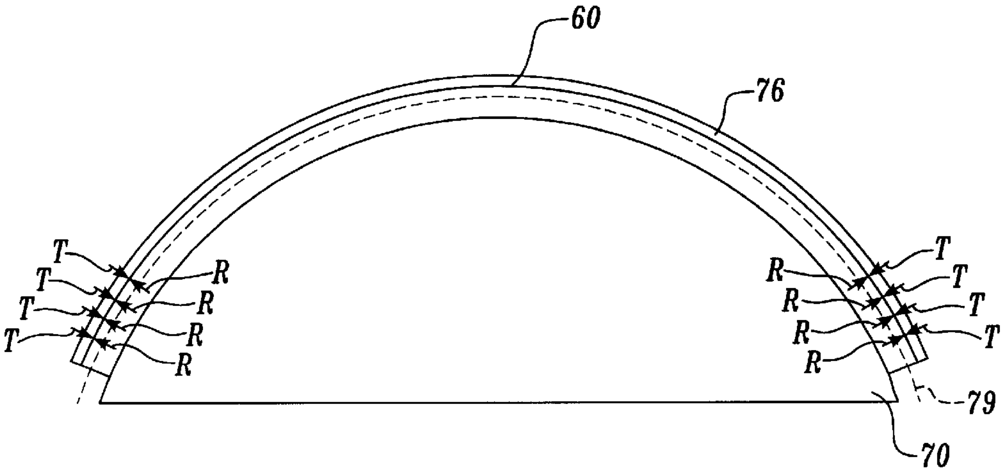
FIG. 16 is diagrammatic view showing the use of a sacrificial sheet in a honeycomb-core composite panel to avoid the warpage shown in FIG. 15.

After the pre-cured doublers 62 and the fiberglass cores 74 are situated on the third convex lay-up mandrel 70, a sacrificial sheet 76 (FIG. 16) is laid over the entire structure. The function of the sacrificial sheet 76 will be described in detail below. The third lay-up mandrel 70 is then bagged and placed in an autoclave and the acoustic core 60, including the pre-cured doublers 62, are cured.

Figure 15:
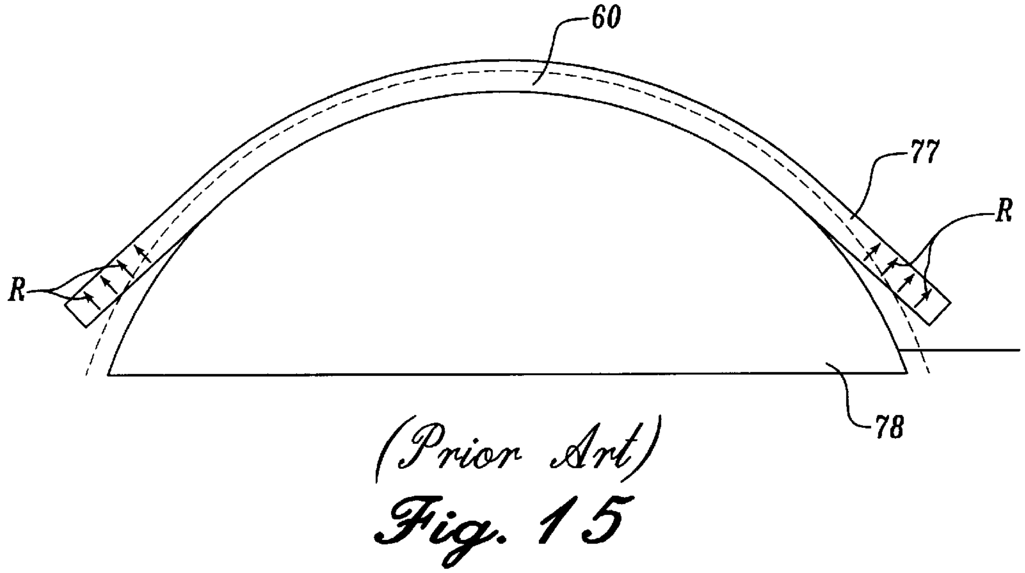
(Prior Art) Fig. 15
FIG. 15 is a diagrammatic view illustrating warpage in a prior art honeycomb-core composite panel.

The sacrificial sheet 76 acts as a structural reinforcement to prevent warpage of the acoustic core 60 during curing. As is known in the art, residual thermal stresses (shown by the arrows at the letter R in the drawings) are produced in honeycomb-core composite panels, such as the acoustic core 60, during cure. As shown in FIG. 15, these residual thermal stresses R cause the edges of a prior art honeycomb-core composite panel 77 to press outward and move away from the surface of a lay-up mandrel 78.

The sacrificial sheet 76 acts as a barrier to prevent the warpage of the panel during and after curing. To perform this function, the sacrificial sheet 76 preferably has good tensile strength and a low coefficient of thermal expansion. An example of an exemplary material to use as the sacrificial sheet 76 is a 0.0045 inch thick sheet of Kevlar®. In addition to having good tensile strength and a low coefficient of thermal expansion, Kevlar® is easy to remove, or has good "peelability", which permits a Kevlar® sheet to be easily removed after cure of the acoustic core 60. Other materials having similar properties can be used.

After the acoustic core 60 is cured, the sacrificial sheet 76 can be removed by peeling or machining. In the preferred embodiment, the sacrificial sheet 76 and approximately 1/10 inch of the acoustic core 60 are removed by machining, corresponding to the dashed cut line 79 in FIG. 16 (not to scale). The low coefficient of thermal expansion of the sacrificial sheet 76 causes the sacrificial sheet to maintain its shape during and after curing. The tendency of the sacrificial sheet 76 to remain in place places pressure on the outer edges of the acoustic core 60 (shown by the arrows T in FIG. 16) counteracts the thermal residual stresses R within the acoustic core 60, and thus holds the acoustic core 60 against the surface of the third convex lay-up mandrel 70 while the acoustic core is being machined. In this manner, the acoustic core 60 can be machined to within close tolerances.

The residual thermal stresses R within the acoustic core 60 remain after the sacrificial sheet 76 is removed. These residual stresses are useful in the formation of the acoustic panel 26, as is described below.

Figure 17:
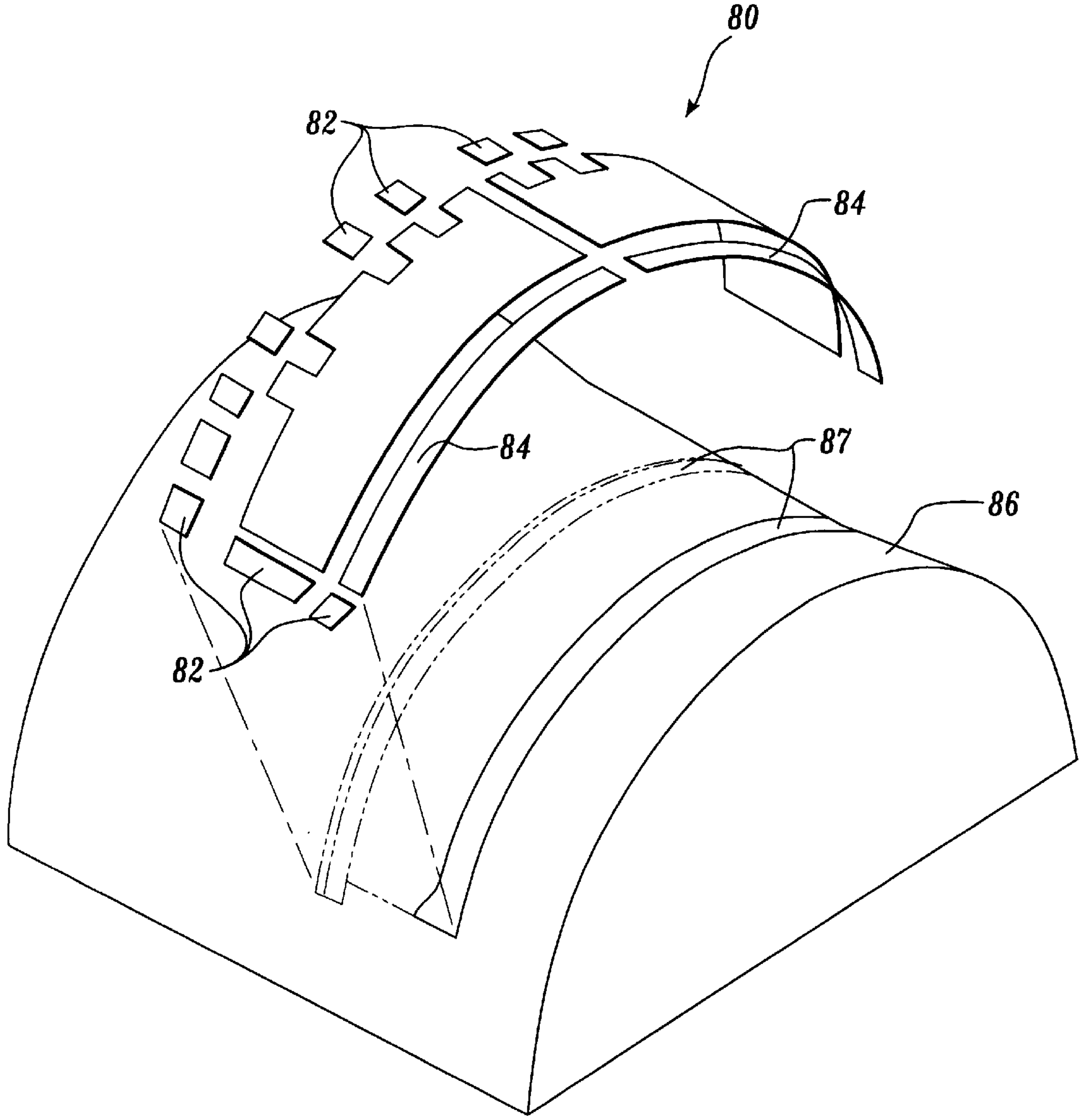
FIG. 17 is an isometric view showing a stage of assembly of a diaphragm core for use in one of the acoustic panels of FIG. 7.
Figure 21:
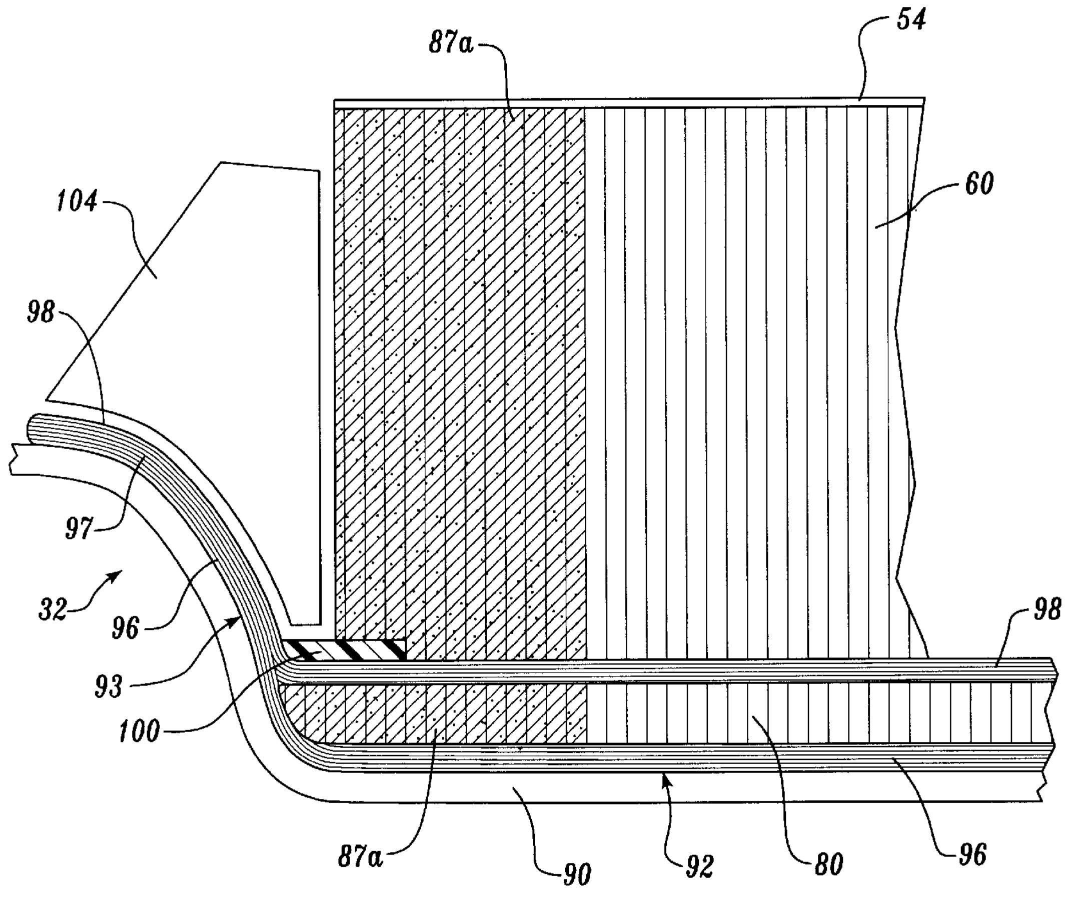
FIG. 21 shows a cross-section, taken fore-to-aft, of the assembly process for the forward ring shown in FIG. 8.

Formation of a diaphragm core 80 is shown in FIG. 17. As can be seen in FIG. 17, the diaphragm core 80 includes dense cores 82 and aramid core pieces 84 that are arranged together on a fourth convex lay-up mandrel 86. Before the dense cores 82 and aramid core pieces 84 are arranged on the fourth convex lay-up mandrel 86, expanding epoxy strips 87 are placed along the forward edge of the location where the dense cores 82 and aramid core pieces 84 are to be placed, the function of which will be described in detail below. The dense cores 82 and aramid core pieces 84 are then arranged on the fourth convex lay-up mandrel 86. The dense cores 82 are positioned so that when the diaphragm core 80 is placed in the acoustic panel 26, the dense cores are directly below the hinge fitting assemblies on the acoustic panel 26. Each of the fiberglass core pieces 84 and the dense cores 82 are joined to adjacent fiberglass core pieces or dense cores by a foaming adhesive (not shown, but well known in the art). The fourth convex lay-up mandrel 86 is then bagged, placed in an autoclave and cured. The expanding epoxy strips 87 expand during the curing process so as to fill the cells at the leading end of the diaphragm core 80 with expanded epoxy 87*a* (FIG. 21). The diaphragm core 80 is then removed from the fourth convex lay-up mandrel 82 and is ready for final assembly.

Figure 19:
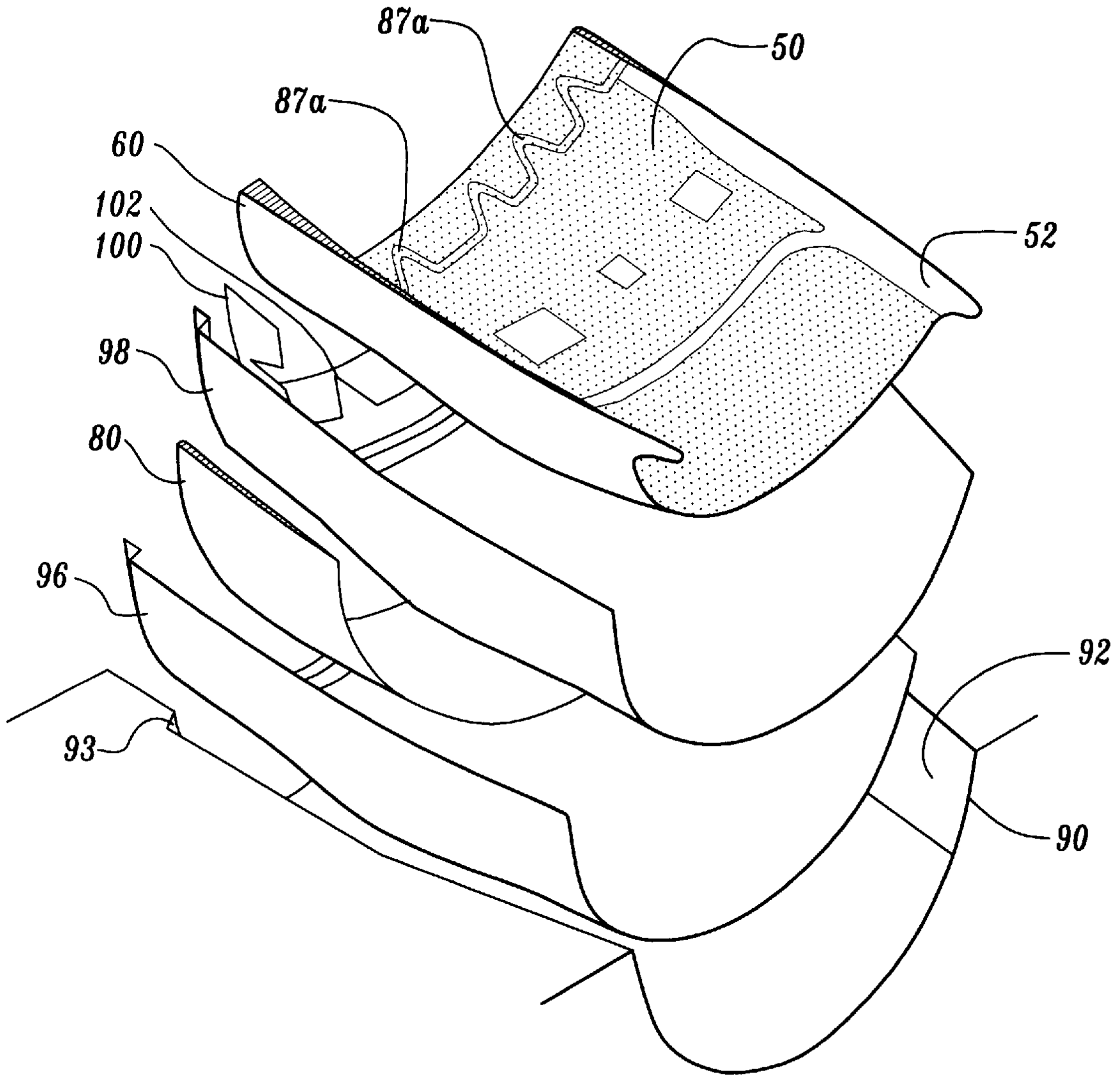
FIG. 19 is an isometric view showing a stage of assembly before final curing of the acoustic panel of FIG. 7.
Figure 20:
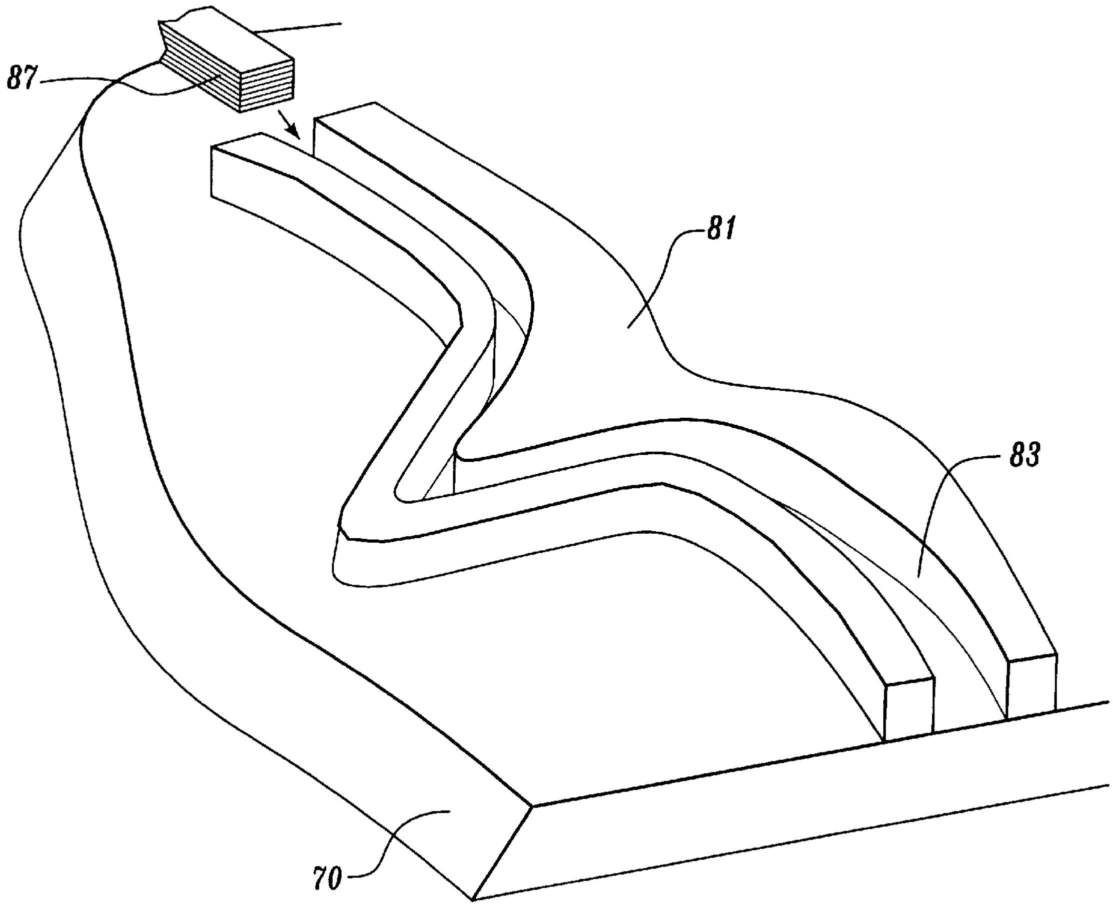
FIG. 20 is an isometric view of the acoustic core of FIG. 19, showing application of expanding epoxy strips to the acoustic core.

Referring now to FIG. 19, a concave lay-up mandrel 90 is used for final assembly and cure of the acoustic panel. The concave lay-up mandrel 90 includes an outer surface 92 that substantially matches the outer surface of the acoustic panel 26, including a forward edge contour 93 (best shown in FIG. 21) that substantially matches the final contour of the forward ring 32. To begin the final assembly, a first wet lay-up of prepreg sheets 96 is situated on the outer surface 92 of the concave lay-up mandrel 90. The prepreg sheets 96 are preferably interwoven fiber impregnated with an epoxy resin. The number of prepreg sheets 96 is preferably three, but any suitable number could be used.

The diaphragm core 80 is fitted against the wet lay-up of prepreg sheets 96 adjacent to the area where the forward ring 32 is to be formed. A second wet lay-up of prepreg sheets 98 is arranged over the diaphragm core 80 and the first wet lay-up of prepreg sheets 96. A peelable sheet 100 is laid over the area which corresponds to the recesses 42 that will be formed in the acoustic panel 26. The peelable sheet 100 is a material that does not form a strong bond with the acoustic panel during cure, thus allowing it to be easily removed, or "peeled" from the acoustic panel 26 after curing. An example of a material to use for the peelable sheet 100 is a Kevlar® sheet that is 0.0045 inches thick (FIG. 19). The peelable sheet includes triangular cutouts 102 which correspond to the wedge fairings 44 that will be formed in the acoustic panel 26.

As can be seen in FIG. 21, additional prepreg sheets 97 are stacked at the contour of the concave lay-up mandrel 90 where the forward ring 32 is to be formed. Preferably, the number of additional sheets added in this area is ten (10), making sixteen (16) layers of prepreg sheets at the forward ring 32, but any suitable number could be used.

The perforated sheet 54 and the acoustic core 60 are laid over the peelable sheet 100 and the second wet lay-up of prepreg sheets 98. The residual thermal stresses R within the acoustic core 60 cause the outer edges of the acoustic core to press against the surfaces of the peelable sheet 100 and the second wet lay-up of prepreg sheets 98, the benefit of which is described in detail below.

A tooling plug 104 (FIG. 21) is abutted against the leading end of the acoustic core 60 and lays over the prepreg material that is to form the forward ring 32. The tooling plug 104 is preferably covered with a non-stick surface, such as Teflon tape (not shown, but well known in the art) so that the tooling plug will not stick to the prepreg material for the forward ring 32 during curing. The tooling plug 104 is used to hold the prepreg material for the forward ring 32 in place during the curing process.

The entire structure including the concave lay-up mandrel 90 is then bagged and placed in an autoclave for curing. The vacuum bag used during the curing process presses the tooling plug 104 against the forward ring 32. The pressure of the tooling plug 104 against the forward ring 32 maintains the forward ring against the contour 93, thus permitting the forward ring to be formed with the complex geometry of the contour 93.

Figure 22:
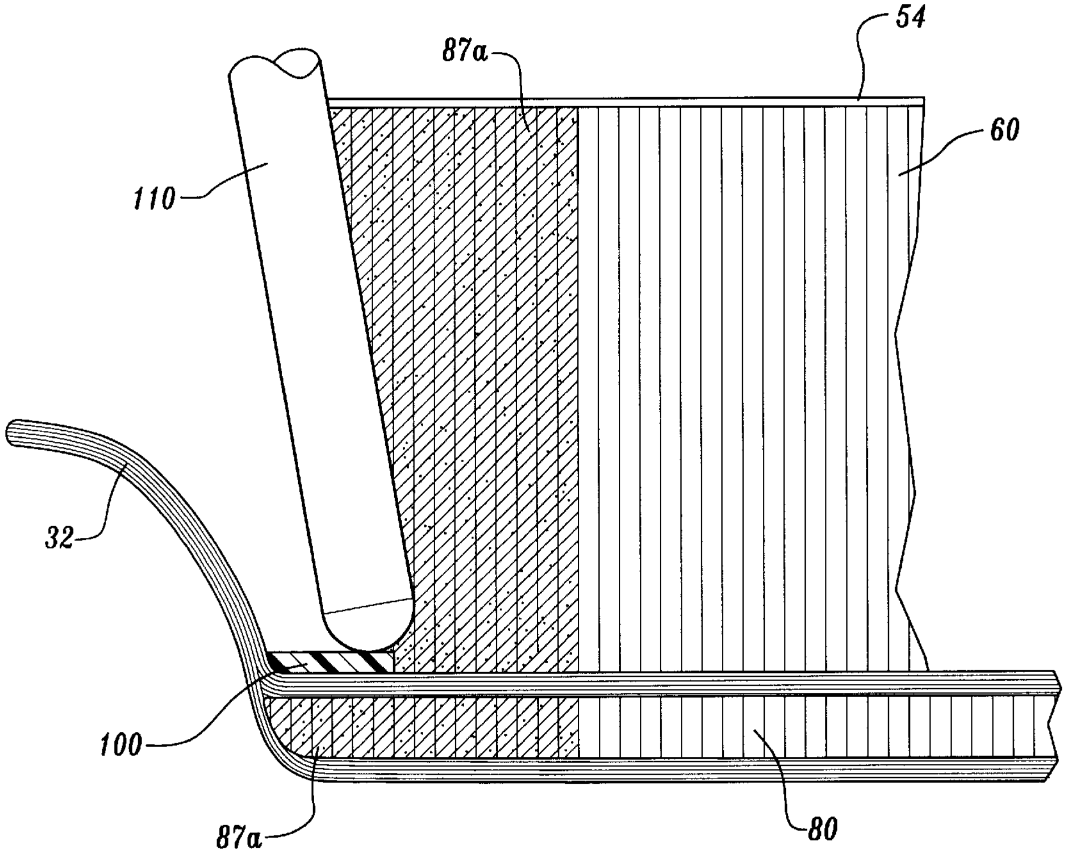
FIG. 22 shows a cross-section, taken fore-to aft, of the assembly process for the wedge fairings of the acoustic panel of FIG. 7.

After curing, the wedge fairings 44 and the recesses 42 are machined out of the forward end of the perforated acoustic core 60. The machining is performed by extending a rotating cutting head 110 (FIG. 22) into the perforated acoustic core 60 and moving the rotating cutting head around the outer edge periphery of the wedge fairings. As can be seen in FIG. 22, the rotating cutting head 110 extends at an angle slightly tilted from 90 degrees with the plane of the acoustic panel 26 so that the rotating cutting head cuts the walls of the wedge fairings 44 at inward angles so that the wedge fairings increase in cross section as they approach the inner side of the acoustic panel 26. The machining by the rotating cutting head 110 occurs in the area of the acoustic core 60 that has expanded and hardened epoxy 87*a* from the expanding epoxy strips 87 in the cells. The expanded and hardened epoxy 87*a* leaves a finished surface that requires only finishing or "coating" after machining.

The rotating cutting head 110 extends to within approximately a tenth of an inch of the peelable sheet 100. After machining, the remaining portions of the perforated acoustic core 60 that are in the recesses 42 are broken away. The peelable sheet 100 does not bond completely to the acoustic core 60 or the composite sheet formed by the wet lay-up of prepreg sheets 98. Therefore, the core material not machined off by the rotating cutting head can be easily picked or broken off of the surface of the composite sheet. In this manner, the recesses 42 and the wedge fairings 44 are formed.

The edges of the acoustic panel 26 are then machined by a rotating cutting head so as to expose the expanded and hardened epoxy 87*a* formed from the expanding epoxy strips 87. As with the area of the recesses 42 and the sides of the wedge fairings 44, the areas require no further machining, sanding, or priming before coating. After coating, the acoustic panel 26 is complete.

The above-described method for forming an acoustic panel 26 offers a structure not present in prior art honeycomb-core composite acoustic panels. This structure offers many advantages over the prior art honeycomb-core acoustic panels. For example, the pre-cured doublers 62 provide increased acoustic area at regions near attached fittings 46.

In addition, the use of the expanding epoxy strips 87 permits the wedge fairings 44 to be formed integral with the acoustic core 60, thus permitting the wedge fairings to have acoustic-absorbing ability. The present inventors have found an increase of acoustic area of at least 29 percent (from 53 to 82 percent) by use of the pre-cured doubler 62 and the integral wedge fairings 44. This increase of acoustic area reduces noise levels from an airplane as much as three decibels during normal operation of a jet engine. In larger nacelle structures, such as in a Boeing 777® airplane, the use of the pre-cured doublers 62 and the integral wedge fairings 44 could increase acoustic area as much as 50 percent. Previous acoustic panels incorporated less than approximately 53 percent or less acoustic area.

The use of the sacrificial sheet 76 permits the acoustic core 60 to maintain its shape during curing without warpage from residual thermal stresses R. The perforated sheet 50 thus maintains a contour that is substantially matched to the outer surface of the third convex lay-up mandrel 70.

Figure 23:
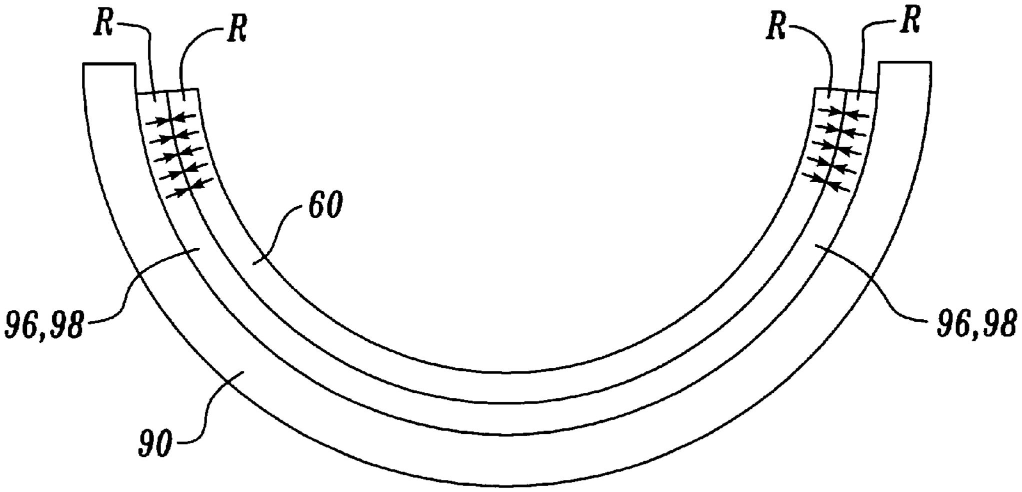
FIG. 23 is a diagrammatic view of an assembled acoustic panel, the view showing off-setting residual thermal stresses within the acoustic panel.

As is shown in FIG. 23, by sequentially forming the acoustic core 60 and then the outer layers 96, 98 of the acoustic panel 26, residual thermal stresses R which are produced in the outer layers during curing in the concave lay-up mandrel 90 are counteracted by the residual thermal stresses in the pre-formed acoustic core 60. The opposing residual thermal stresses R work against each other so that warpage of the acoustic panel 26 does not occur. Therefore, by the process of sequential tooling, residual thermal stresses R within the acoustic panel 26 are substantially eliminated and the inner and outer surfaces of the acoustic panel 26 substantially match the inner and outer surfaces of the concave lay-up mandrel 90 and the convex lay-up mandrel 86. Therefore, unlike the prior art processes of forming stacked honeycomb-core composite panels, the present method permits close tolerances for the inner and outer surfaces of the acoustic panel 26.

Because the inner and outer surfaces of the acoustic panel are formed to close tolerances, shimming and work up of the acoustic panel 26 so as to fit the acoustic panel to the outer cowl panel 24 and attaching hardware on the acoustic panel is not necessary. This benefit decreases the labor time for assembly of the panels by a substantial amount.

The use of the tooling plug 104 in formation of the forward ring 32 permits the complex geometry of the forward ring to be formed simultaneous with forming of the acoustic panel 26. Therefore, the forward ring is formed integral with the acoustic panel 26. This configuration saves much labor time over prior art processes and reduces the number of parts used for an acoustic panel.

The expanding epoxy strips 87 add several advantages to the acoustic panel 26. Use of the expanding epoxy strips 87 for the edge surfaces of the acoustic panel 26 provides an easily machinable surface that requires no further finishing after cutting. Thus, the expanding epoxy strips 87 reduce labor time needed for formation of the acoustic panel 26. In addition, the expanded and hardened epoxy 87*a* is much lighter than potting compounds used in the past, reducing the overall weight of the acoustic panel 26.

The expanding epoxy strips 87 add another advantage to the acoustic panel 26. In prior art honeycomb-core composite panels, ultrasonic inspection was performed on the panels to determine flaws in construction. However, as is described in the Background section of this disclosure, ultrasonic inspection is difficult to perform on complex curvature in the prior art panels. For example, at the leading edge of the diaphragm core 80 (FIG. 21), the diaphragm core tapers to a small cross section and the outer surface of the acoustic panel 26 undergoes drastic curvature at the start of the forward ring 32. Ultrasonic inspection at this curvature is typically not possible because the ultrasonic signals tend to propagate along the acoustic panel 26 instead of through the acoustic panel. By providing expanded and hardened epoxy 87*a* at these regions, ultrasonic inspection can be successfully performed.

While the preferred embodiment of the invention has been illustrated and described with reference to preferred embodiments thereof, it will be appreciated that various changes can be made therein without departing from the spirit and scope of the invention as defined in the appended claims.

What is claimed is:

1. A method of forming a forward ring integral with a composite panel, comprising the steps of:

stacking an inner face sheet, a honeycomb core, and first outer face sheet on a lay-up mandrel;

arranging composite material for an integral ring against the lay-up mandrel having a contour that substantially matches an intended final shape of the integral ring;

placing a plug against the side of the composite material for the integral ring opposite of the contour of the lay-up mandrel;

bagging the acoustic panel with a vacuum bag so that the vacuum bag is placed around and against the plug; and applying to the vacuum bag during curing so that the plug presses the material for the integral ring in place.

2. A method of forming a composite acoustic panel having integral wedges comprising:

providing an outer composite sheet;

extending a peelable sheet having a predetermined pattern for the aft portion of the wedge formed therein on the aft portion of the outer composite sheet;

arranging a composite core having expanded and hardened epoxy inserted where the aft edges of the wedge fairings will be formed over the outer composite sheet and the peelable sheet;

arranging a perforated composite inner sheet over the composite core;

machining the perforated composite inner sheet and the composite core substantially to the peelable sheet along a machine line at a pattern that forms the aft portion of the wedge fairings; and removing the portion of the composite core aft of the machined line.

* * * * *